US011115383B2

(12) United States Patent
Mundra et al.

(10) Patent No.: US 11,115,383 B2
(45) Date of Patent: Sep. 7, 2021

(54) SYSTEM ON CHIP FIREWALL MEMORY ARCHITECTURE

(71) Applicant: Texas Instruments Incorporated, Dallas, TX (US)

(72) Inventors: Amritpal Singh Mundra, Allen, TX (US); Chunhua Hu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 167 days.

(21) Appl. No.: 16/221,318

(22) Filed: Dec. 14, 2018

(65) Prior Publication Data

US 2019/0364018 A1 Nov. 28, 2019

Related U.S. Application Data

(60) Provisional application No. 62/676,050, filed on May 24, 2018.

(51) Int. Cl.
*H04L 29/06* (2006.01)

(52) U.S. Cl.
CPC .................. *H04L 63/0218* (2013.01)

(58) Field of Classification Search
CPC .................. H04L 63/0218; H04L 63/02; H04L 4129/06557
See application file for complete search history.

(56) References Cited

U.S. PATENT DOCUMENTS

| 8,307,416 B2* | 11/2012 | Conti ................. G06F 12/1483 726/11 |
| 8,874,926 B1* | 10/2014 | Edwards ............... G06F 21/556 713/180 |
| 2005/0021874 A1* | 1/2005 | Georgiou .............. H04L 49/602 709/250 |

(Continued)

FOREIGN PATENT DOCUMENTS

WO  2008081032 A1  7/2008

OTHER PUBLICATIONS

PCT Search Report dated Sep. 19, 2019.
European Search Report for 19806759.7 dated May 26, 2021.

*Primary Examiner* — Sher A Khan
(74) *Attorney, Agent, or Firm* — Brian D. Graham; Charles A. Brill; Frank D. Cimino

(57) ABSTRACT

In described examples, a system on a chip (SoC) and method for sending messages in the SoC include determining locations of initiator-side firewall block and receiver-side firewall block memories using respective pointers to the firewall block memories stored in a single, contiguous memory. Addresses of the pointers within the single memory depend on respective unique firewall identifiers of the firewall blocks. An exclusive security configuration controller uses the pointers to configure the firewall blocks over a security bus which is electrically isolated from a system bus. The system bus is used to send messages from sending functional blocks to receiving functional blocks. The initiator-side firewall block adds a message identifier to messages. The (Continued)

message identifier depends on the initiator-side firewall block's configuration settings. The receiver-side firewall block controls permission for the receiving functional block to access the message, depending on the message identifier and the receiver-side firewall block's configuration settings.

21 Claims, 3 Drawing Sheets

(56) References Cited

U.S. PATENT DOCUMENTS

| | | | | |
|---|---|---|---|---|
| 2007/0011419 A1* | 1/2007 | Conti | ............... | G06F 12/1458 711/163 |
| 2007/0022479 A1* | 1/2007 | Sikdar | ............... | H04L 63/0218 726/22 |
| 2007/0250912 A1* | 10/2007 | Rassool | ............ | H04N 7/17318 726/4 |
| 2009/0025077 A1* | 1/2009 | Trojanowski | ...... | H04L 41/0803 726/11 |
| 2009/0049220 A1 | 2/2009 | Conti et al. | | |
| 2009/0177826 A1* | 7/2009 | Conti | ............... | G06F 21/554 710/262 |
| 2011/0145909 A1* | 6/2011 | Rachakonda | ........ | G06F 13/40 726/11 |
| 2012/0047366 A1* | 2/2012 | Yoo | ............... | H04L 63/145 713/171 |
| 2012/0311690 A1* | 12/2012 | Ellis | ............... | G06F 21/85 726/11 |
| 2012/0317224 A1* | 12/2012 | Caldwell | ............... | H04W 16/14 709/217 |
| 2014/0223569 A1* | 8/2014 | Gail | ............... | G06F 21/00 726/26 |
| 2015/0277949 A1 | 10/2015 | Loh et al. | | |
| 2016/0004647 A1* | 1/2016 | Eppensteiner | ........ | G06F 12/14 710/110 |
| 2016/0028728 A1* | 1/2016 | Hampel | ............... | G06F 21/71 713/156 |
| 2016/0094552 A1* | 3/2016 | Durham | ............... | G06F 21/00 713/171 |
| 2017/0344502 A1* | 11/2017 | Fernaid | ............... | G06F 13/364 |
| 2018/0063100 A1* | 3/2018 | Peeters | ............... | H04L 63/061 |
| 2018/0212839 A1* | 7/2018 | Hiers | ............... | H04L 41/12 |
| 2019/0095655 A1* | 3/2019 | Krawczewicz | ....... | H04W 12/06 |

* cited by examiner

SYSTEM ON CHIP FIREWALL MEMORY ARCHITECTURE

CROSS-REFERENCE TO RELATED APPLICATIONS

This application is a non-provisional of, and claims priority to, U.S. Provisional Patent Application Ser. No. 62/676,050, filed May 24, 2018. This application is related to U.S. patent application Ser. No. 15/679,307, filed Aug. 17, 2017. Both of the above-described applications are incorporated herein by reference.

BACKGROUND

This application relates generally to hardware-based security in integrated circuit (IC) devices, and more particularly to memory and bus architecture of hardware-based security.

A system on a chip (SoC) comprises multiple functional blocks, with different functional blocks—and, typically, different sub-blocks within functional blocks—having different functions. For example, functional blocks or sub-blocks (for convenience, collectively referred to as "functional blocks" herein) on an SoC can include one or more microcontrollers, microprocessors, or digital signal processor (DSP) cores; memory blocks, such as read-only memory (ROM) or random-access memory (RAM); clock signal generators; input/output (I/O) interfaces; analog interfaces; voltage regulators and power management circuits; and intellectual property (IP) cores. Hardware-based security, i.e., controlling at a hardware level the message flow among functional blocks, can be used to harden an SoC against attackers attempting to gain unauthorized access to (for example) message contents, memory contents, device functions, and device I/O and corresponding communication permissions.

SUMMARY

In described examples, a system on a chip (SoC) and method for sending messages in the SoC include determining locations of initiator-side firewall block and receiver-side firewall block memories using respective pointers to the firewall block memories stored in a single, contiguous memory. Addresses of the pointers within the single memory depend on respective unique firewall identifiers of the firewall blocks. An exclusive security configuration controller uses the pointers to configure the firewall blocks over a security bus which is electrically isolated from a system bus. The system bus is used to send messages from sending functional blocks to receiving functional blocks. The initiator-side firewall block adds a message identifier to messages. The message identifier depends on the initiator-side firewall block's configuration settings. The receiver-side firewall block controls permission for the receiving functional block to access the message, depending on the message identifier and the receiver-side firewall block's configuration settings.

DETAILED DESCRIPTION

Robust system on a chip (SoC) hardware-based security can use hardware-enforced mutual isolation of different functional blocks from each other. That is, messages sent by a functional block at a corresponding security level or within a corresponding secure region of the SoC should be restricted from accessing resources within a functional block at a different security level or within a different secure region of the SoC. Restriction can depend, for example, on properties (such as permissions, encryption, and cryptographic key accessibility) of respective messages, sending functional blocks, and receiving functional blocks.

Figure 1:
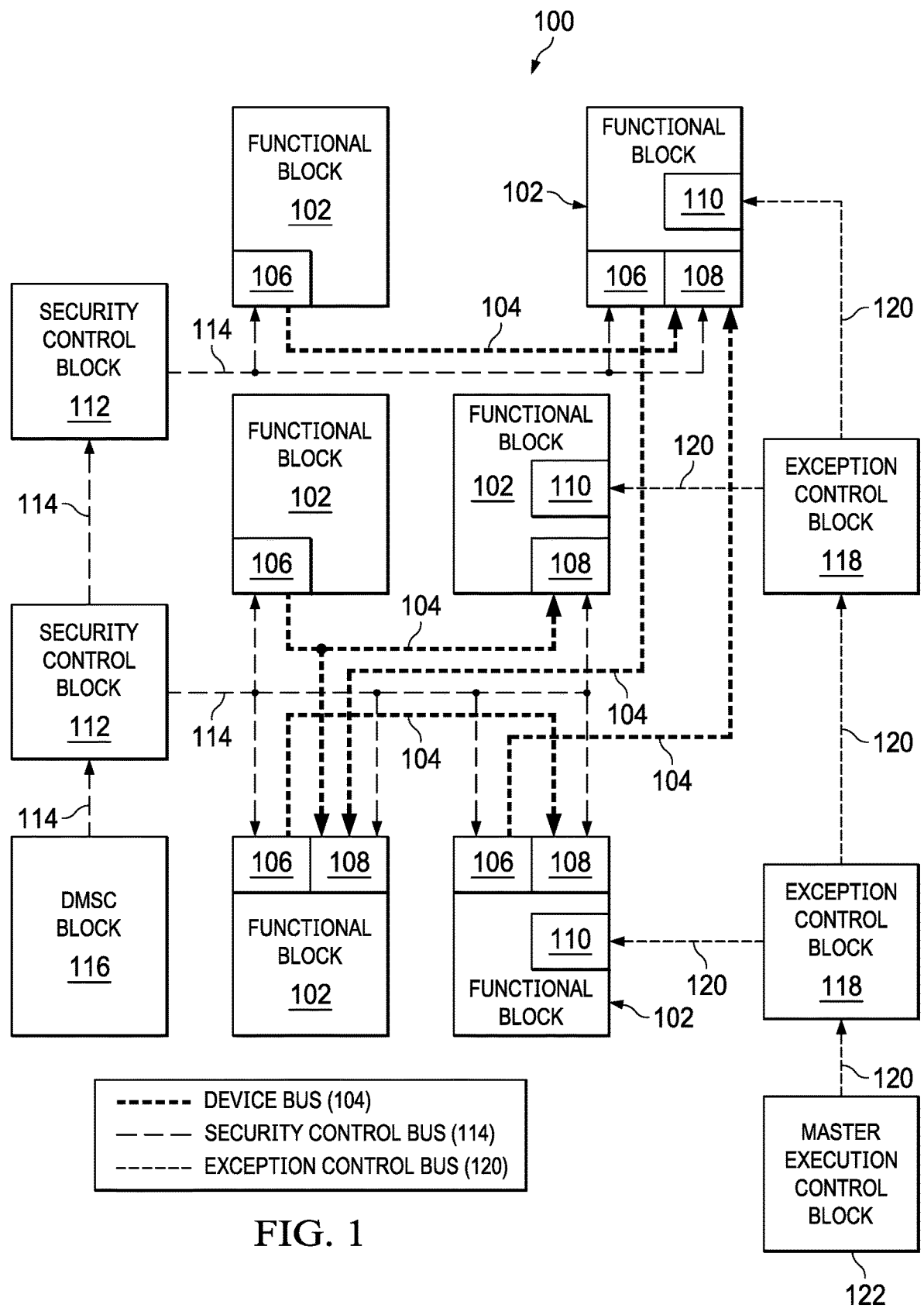
FIG. 1 shows an example of a functional block layout of an SoC.

FIG. 1 shows an example of a functional block layout of an SoC 100. As shown in FIG. 1, various functional blocks 102 in the SoC 100 are connected to each other by a device bus 104. A few functional blocks 102 are shown. The number of functional blocks 102 in an SoC can vary. The device bus 104 refers to the bus or busses which connect(s) the various non-security and non-security exception functional blocks 102. In typical prior art embodiments, a device bus 104 also connects to security and security exception blocks. Messages between functional blocks 102 are generally transmitted through the device bus 104. Some (or all) functional blocks 102 contain initiator-side firewall blocks 106, which apply security-related content (such as an identifier (ID) of the functional block 102 which originated the message, and encryption) to messages to prepare messages for transmission to other functional blocks 102. Some (or all) functional blocks 102 contain receiver-side firewall blocks 108, which determine (such as by checking the ID attached to the message by the corresponding initiator-side firewall block 106) whether a message has permission to be accessed by a respective functional block 102 receiving the message (for example, to execute the contents of the message or to pass the message to a downstream recipient), and to enable such access if permission is confirmed. Access by the respective functional block 102 refers to permission for the message to be acted upon by resources of the functional block 102 other than (in addition to) (1) resources included within a corresponding receiver-side firewall block 108, and/or (2) resources which were utilized by the corresponding receiver-side firewall block 108 in determining whether the message has access permission for the functional block 102. One or more functional blocks 102 also contain exception probe blocks 110 connected to initiator-side firewall blocks 106 and/or receiver-side firewall blocks 108 within the same functional block 102. Exception probe blocks 110 include memory elements which store configuration information for respective exception probe blocks 110.

Initiator-side firewall blocks 106 and receiver-side firewall blocks 108 are controlled by (subsidiary) security control blocks 112. Security control blocks 112 are connected to each other, and are connected to control initiator-side and receiver-side firewall blocks 106, 108, by a security control bus 114. Initiator-side firewall blocks 106 and receiver-side firewall blocks 108 (collectively, "firewall blocks" 106, 108) include memory elements which store configuration information for respective firewall blocks 106, 108. Security control blocks 112 also include memory elements which store configuration information for respective security control blocks 112; configuration information for security control blocks 112 is typically pre-set by hardware design for security purposes. Configuration information can determine, for example, whether and how different permission levels (such as user, supervisor, and debug modes) are applied to messages. The security control bus 114 is electrically isolated from the device bus 104, to prevent unauthorized access to the security control bus 114 (that is, the security control bus 114 is dedicated specifically to connecting security infrastructure; messages are not sent between functional blocks 102 via the security control bus 114). Accordingly, security control bus 114 interconnects are independent from device bus 104 interconnects. Security control blocks 112 are controlled by a single, exclusive device management and security control (DMSC) block 116. The DMSC block 116 is connected to control the security control blocks 112, and to control initiator-side and receiver-side firewall blocks 106, 108 (via the security control blocks 112), by the security control bus 114. The DMSC block 116 being a "single, exclusive" block refers to device structure underlying DMSC functionality being connected so that there are not multiple, independently operating loci of DMSC functionality (accordingly, there is a "single," not "multiple," DMSC blocks 116). This can be seen as DMSC functionality being connected serially, not in parallel, as seen from the security control blocks 112. The DMSC block 116 is capable of causing changes to configuration data stored in the memory elements of the firewall blocks 106, 108.

As can be seen from FIG. 1, firewall blocks 106, 108 are generally distributed throughout an SoC 100 employing hardware-based security. Use of the DMSC block 116 as a unified control for security infrastructure of the SoC 100, along with an independent security control bus 114, enables configuration of memory so that software can view memory elements of the initiator-side and receiver-side firewall blocks 106, 108 (together, firewall blocks 106, 108), as comprising a single, unified, contiguous memory region, as further described with respect to FIG. 2.

Exception probe blocks 110 determine when an exception occurs in initiator-side or receiver-side firewall blocks 106, 108. Exception probe blocks 110 are controlled by exception control blocks 118. Exception probe blocks 110 include memory elements which store configuration information of the exception probe blocks 110. Exception control blocks 118 are connected to each other, and are connected to control the exception probe blocks 110, by an exception control bus 120. The exception control bus 120 is electrically isolated from the device bus 104, and from the security control bus 114, to prevent unauthorized access to the exception control bus 120.

Initiator-side firewall blocks 106 can be configured to, for example, assign unique security IDs to and/or assert security attributes of messages between functional blocks 102. Receiver-side firewall blocks 108 can be configured to, for example, set permissions corresponding to source functional blocks 102 or other properties of messages which are (or are not) allowed to access corresponding destination functional blocks 102.

Figure 2:
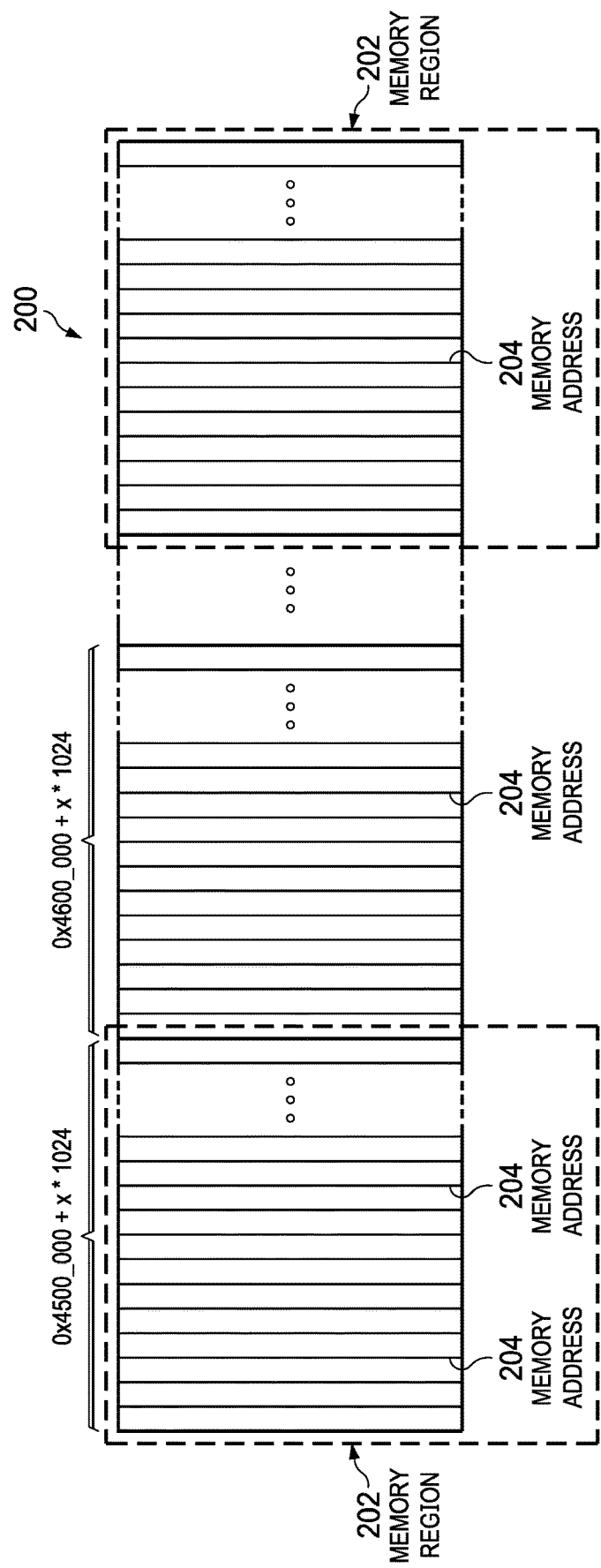
FIG. 2 shows an example map of a memory used to access the various memories of firewall blocks.

FIG. 2 shows an example map of a memory 200 used to access the various memories of firewall blocks 106, 108. The memory 200 spans a fixed range within a memory of the SoC 100. The memory 200 contains multiple memory regions 202 (divided depending on, for example, the requirements of the particular SoC 100) storing pointers to the locations of the various memories of the firewall blocks 106, 108. Different memory regions 202 contain pointers to locations of memories corresponding to different types of functions (different subsystems) of the firewall blocks 106, 108. For example, memory regions 202 can correspond to (contain pointers enabling access to) security configuration data for initiator-side and receiver-side firewall blocks 106, 108, security configuration data for security control blocks 112, exception configuration data for initiator-side and receiver-side firewall blocks 106, 108, boot control configuration data, emulation configuration data, virtualization configuration data, and quality-of-service (QoS) configuration data. Accordingly, the memory 200 acts as a middleman (intermediary) between (1) software and (2) firewall block 106, 108 configuration memories.

Each firewall block 106, 108 is allocated a different identifier (ID). Identical initiator-side firewall block 106 designs and identical receiver-side firewall block 108 designs can be used across a platform comprising multiple SoCs 100. This enables IDs to be allocated globally for all firewall blocks 106, 108 in all SoCs 100 in the same platform, so that identically situated (e.g., with respect to a particular subsystem type of functional block 102), identically designed firewall blocks 106, 108 in different SoCs in a platform can receive the same ID. Having the same ID enables the memory elements of identically situated, identically designed firewall blocks 106, 108 in different SoCs in a platform to be called the same way by software. Global assignment of IDs can simplify configuration of firewall blocks 106, 108 in SoCs throughout a platform: often, it is advantageous to identically configure identically-designed firewall blocks 106, 108. This is facilitated by the ability to access firewall blocks 106, 108 on different SoCs in the same way. Global assignment of IDs also enables a provision to software of a consistent view of configuration of firewall blocks 106, 108 (with configuration memory consistently and predictably addressable based on firewall block 106, 108 ID) when there are multiple types of firewall blocks 106, 108. This consistent view of configuration memory can also be provided when the number of firewall blocks 106, 108 varies from SoC to SoC across a platform (pre-allocated address space for a type of firewall blocks 106, 108 (such as boot control or QoS) can be sized to accommodate the number of that type of firewall blocks 106, 108 being used).

Types of firewall blocks 106, 108 can include, for example, memory region firewall blocks and channelized firewall blocks. Memory region firewall blocks can, for example, serve functional blocks (memories) as a whole, or enable different permissions for different regions of corresponding memories. For example, a Host-1 can have full access to a memory behind a memory region firewall block, while a Host-2 has only a window view of the memory behind the memory region firewall block. Channelized firewall blocks are typically fine-grained, with larger numbers of firewall structures gating access to respective, relatively finely-divided portions of the memory.

IDs can be encoded in register transfer level (RTL) configuration files, with IDs fixed for respective SoCs. RTL automation scripts can be used to determine memory addresses corresponding to respective IDs as described below.

Each firewall block 106, 108 ID can be used to create, for each memory region 202 storing security configuration data, a memory address 204 that corresponds uniquely (on the corresponding SoC 100) to that firewall block 106, 108. This can be done using a pre-defined mathematical calculation. For example, pointers to memory elements in a memory region 202 storing configuration data for different firewall blocks 106, 108 can be addressed so that a first bit of stored pointer information for one firewall block 106, 108 is 1024 bits away from a first bit of adjacently-stored pointer information for another firewall block 106, 108. Accordingly, an example 48 bit address for a firewall block 106, 108 can be configured to be calculated as: for firewall block 106, 108 numbered "x" (x≥0), address=0x4500_0000+x*1024. This can be used to create a memory map for secure configuration data that is unified and contiguous, so that software can access security asset memory as if it were located in a single, compact memory space, rather than distributed across the SoC.

This can also be done for memory regions 202 storing pointers to configuration memories for exception control blocks 110. Exception control blocks 118 and exception probe blocks 110 are connected by an exception control bus 120 which is electrically isolated from the device bus 104 and the security control bus 114, and configuration of exception probe blocks 110 is controlled by a single master exception control block 122 (similarly to control of configuration of firewall blocks 106, 108 by the DMSC block 116). Pointers to configuration memories of different groups of blocks are stored in memory regions 202 with different base addresses, and different groups of blocks have different respective ID ranges to generate memory addresses within respective memory regions 202 corresponding to respective blocks.

A unified, contiguous memory map enables software designed for firewall blocks 106, 108 having designs which are reused from system to system (which can save hardware design resources) to also be reused from system to system. For example, consider a first SoC which uses four initiator-side firewall blocks 106 and two receiver-side firewall blocks 108, and a second SoC which uses six initiator-side firewall blocks 106 and five receiver-side firewall blocks 108. If the firewall block 106, 108 designs from the first SoC are reused for the second SoC, then security configuration software for the second SoC can reuse the security configuration software for the first SoC, and (with respect to firewall blocks 106, 108) only needs to add code to address the newly added two initiator-side firewall blocks 106 (six minus four) and three receiver-side firewall blocks 108 (five minus two). This can save software design resources, reducing design cost, complexity, and the time it takes to launch a corresponding product. Reduction in complexity can, in turn, reduce the likelihood of design errors, further reducing costs and product launch time.

Figure 3:
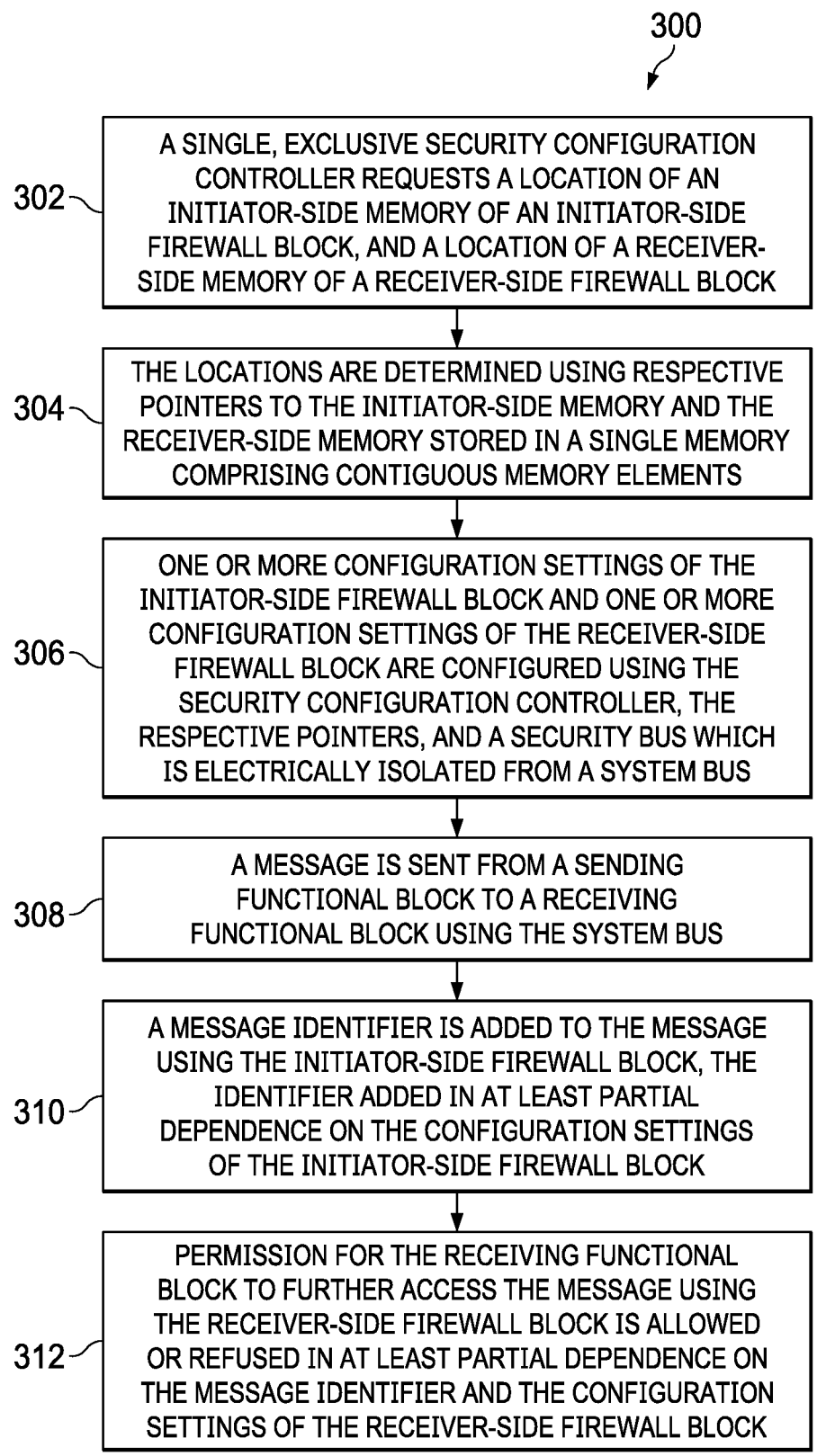
FIG. 3 shows an example of a process for sending messages between functional blocks in an SoC.

FIG. 3 shows an example of a process 300 for sending messages between functional blocks in an SoC. In step 302, a single, exclusive security configuration controller requests a location of an initiator-side memory of an initiator-side firewall block, and a location of a receiver-side memory of a receiver-side firewall block. In step 304, the locations are determined using respective pointers to the initiator-side memory and the receiver-side memory stored in a single memory comprising contiguous memory elements. Addresses of the pointers within the single memory are determined in at least partial dependence on respective unique firewall identifiers of the initiator-side firewall block and of the receiver-side firewall block. In step 306, one or more configuration settings of the initiator-side firewall block and one or more configuration settings of the receiver-side firewall block are configured using the security configuration controller, the respective pointers, and a security bus which is electrically isolated from a system bus. In step 308, a message is sent from a sending functional block to a receiving functional block using the system bus. In step 310, a message identifier is added to the message using the initiator-side firewall block, the identifier added in at least partial dependence on the configuration settings of the initiator-side firewall block. In step 312, permission for the receiving functional block to further access the message using the receiver-side firewall block is allowed or refused in at least partial dependence on the message identifier and the configuration settings of the receiver-side firewall block.

Modifications are possible in the described embodiments, and other embodiments are possible, within the scope of the claims.

In some embodiments, use of globally-allocated firewall block IDs simplifies creation of chip support library (CSL) files.

In some embodiments, ID ranges in a memory are reserved for future expansion.

In some embodiments, multiple secure worlds, corresponding to multiple different security levels, co-exist within an SoC. In some embodiments, whether and how different secure worlds are used is determined by firewall block configuration information.

In some embodiments, one or more firewall blocks are not contained within a functional block.

In some embodiments, the DMSC block sets one configuration of one firewall block at a time. In some embodiments, the DMSC block sets one configuration of multiple firewall blocks at a time. In some embodiments, the DMSC block sets multiple configurations of one firewall block at a time. In some embodiments, the DMSC block sets multiple configurations of multiple firewall blocks at a time.

In some embodiments, the DMSC block can set configuration information of security control blocks.

What is claimed is:

1. A system on a chip (SoC), comprising:
multiple functional blocks coupled to a system bus configured to communicate among ones of the functional blocks coupled to the system bus;
the functional blocks configured to perform at least one of sending messages to or receiving messages from other ones of the functional blocks through the system bus;
multiple initiator-side firewall blocks, different ones of the initiator-side firewall blocks corresponding to different ones of the functional blocks, the initiator-side firewall blocks having respective initiator-side memories configured to store configuration settings of the respective initiator-side firewall blocks, the initiator-side firewall blocks configured so that, when a sending one of the functional blocks sends a sent message to a receiving functional block on the system bus, the initiator side firewall block corresponding to the sending functional block adds an identifier to the sent message in at least partial dependence on the configuration settings of the corresponding initiator-side firewall block;
multiple receiver-side firewall blocks, different ones of the receiver-side firewall blocks corresponding to different ones of the functional blocks, the receiver-side firewall blocks having respective receiver-side firewall block memories configured to store configuration settings of the respective receiver-side firewall blocks, the receiver-side firewall blocks configured so that, when the receiving functional block receives the sent message on the system bus, the receiver-side firewall block corresponding to the receiving functional block allows or refuses permission for the sent message to be accessed by the receiving functional block in at least partial dependence on the configuration settings of the corresponding receiver-side firewall block and on the identifier;
a security bus which is electrically isolated from the system bus, the security bus coupled to the initiator-side firewall blocks and to the receiver-side firewall blocks; and a single security configuration controller coupled to the security bus and configured to use the security bus to exclusively control the configuration settings to be stored in all of the initiator-side firewall block memories and all of the receiver-side firewall block memories.

2. The SoC of claim 1, wherein the identifier uniquely corresponds to the sending functional block.

3. The SoC of claim 1, wherein the functional blocks are configured not to transmit messages to each other through the security bus.

4. The SoC of claim 1, wherein each of the initiator-side firewall blocks and each of the receiver-side firewall blocks is configured to have a firewall identifier which is unique within the SoC.

5. The SoC of claim 4,
wherein an SoC system comprises a plurality of the SoCs, and
wherein the firewall identifiers are allocated so that initiator-side firewall blocks and/or receiver-side firewall blocks which are on different SoCs in the SoC system have the same firewall identifier if they have identical design and correspond to identical-design functional blocks.

6. The SoC of claim 4, further comprising a memory which is a contiguous block of memory elements, the memory configured to store pointers to the locations of each of the initiator-side firewall blocks and each of the receiver-side firewall blocks on the SoC at addresses within the memory, the addresses corresponding to, and being determined by firewall identifiers of, respective ones of the initiator-side firewall blocks and receiver-side firewall blocks.

7. A system on a chip (SoC), comprising:
multiple functional blocks coupled to one another on a system bus, ones of the functional blocks configured to perform at least one of send messages to and receive messages from other ones of the functional blocks using the system bus;
multiple initiator-side firewall blocks, different ones of the initiator-side firewall blocks corresponding to different ones of the functional blocks, the initiator-side firewall blocks having respective initiator-side firewall block memories configured to store configuration settings of the respective initiator-side firewall blocks, the initiator-side firewall blocks configured so that, when a sending one of the functional blocks sends a sent message to a receiving functional block, the initiator-side firewall block corresponding to the sending functional block adds an identifier to the sent message in at least partial dependence on the configuration settings of the corresponding initiator-side firewall block;
multiple receiver-side firewall blocks, different ones of the receiver-side firewall blocks corresponding to different ones of the functional blocks, the receiver-side firewall blocks having respective receiver-side firewall block memories configured to store configuration settings of the respective receiver-side firewall blocks, the receiver-side firewall blocks configured so that, when the receiving functional block receives the sent message, the receiver-side firewall block corresponding to the receiving functional block allows or refuses permission for the sent message to be accessed by the receiving functional block in at least partial dependence on the configuration settings of the corresponding receiver-side firewall block and on the identifier, wherein each of the initiator-side firewall blocks and each of the receiver-side firewall blocks configured to have a corresponding firewall identifier which is unique within the SoC; and
a memory which is a contiguous block of memory elements, the memory configured to store pointers to the locations of each of the initiator-side firewall blocks and each of the receiver-side firewall blocks on the SoC at addresses within the memory, the addresses corresponding to, and being determined by firewall identifiers of, respective ones of the initiator-side firewall blocks and receiver-side firewall blocks.

8. The SoC of claim 7, wherein the identifier uniquely corresponds to the sending functional block.

9. The SoC of claim 7,
wherein an SoC system comprises a plurality of the SoCs, and
wherein the firewall identifiers are allocated so that initiator-side firewall blocks and/or receiver-side firewall blocks which are on different SoCs in the SoC system have the same firewall identifier if they have identical design and correspond to identical-design functional blocks.

10. The SoC of claim 7, further comprising:
the system bus coupled to the functional blocks, the functional blocks configured to send and receive the messages through the system bus;
a security bus which is electrically isolated from the system bus, the security bus coupled to the initiator-side firewall blocks and to the receiver-side firewall blocks; and
a single security configuration controller configured to use the security bus to exclusively control the configuration settings to be stored in all of the initiator-side firewall block memories and all of the receiver-side firewall block memories.

11. The SoC of claim 10, wherein the functional blocks are configured not to transmit messages to each other through the security bus.

12. A system on a chip (SoC), comprising:
multiple functional blocks coupled to a system bus, the functional blocks configured to perform at least one of send messages to and receive messages from other ones of the functional blocks through the system bus; ones of the functional blocks comprising one or more of:
an initiator-side firewall block coupled to the system bus and comprising an initiator-side memory configured to store configuration settings of the initiator-side firewall block, the initiator-side firewall block configured to add an identifier to a sent message sent on the system bus by a sending one of the functional blocks to a receiving one of the functional blocks in at least partial dependence on the configuration settings of the initiator-side firewall block; and
a receiver-side firewall block coupled to the system bus comprising a receiver-side memory configured to store configuration settings of the receiver-side firewall block, the receiver-side firewall block configured to electively allow or refuse permission for the received message to be further accessed by the receiving functional block in at least partial dependence on the configuration settings of the receiver-side firewall block and on the identifier;
a security bus which is electrically isolated from the system bus, the security bus coupled to the initiator-side firewall blocks and to the receiver-side firewall blocks; and a single security configuration controller coupled to the security bus and configured to use the security bus to exclusively control the configuration settings to be stored in all of the initiator-side memories and all of the receiver-side memories.

13. The SoC of claim 12, wherein the identifier uniquely corresponds to the sending functional block.

14. The SoC of claim 12, wherein the functional blocks are configured not to transmit messages to each other through the security bus.

15. The SoC of claim 12, wherein each of the initiator-side firewall blocks and each of the receiver-side firewall blocks is configured to have a firewall identifier which is unique within the SoC.

16. The SoC of claim 15,
wherein an SoC system comprises a plurality of the SoCs, and
wherein the firewall identifiers are allocated so that initiator-side firewall blocks and/or receiver-side firewall blocks which are on different SoCs in the SoC system have the same firewall identifier if they have identical design and correspond to identical-design functional blocks.

17. The SoC of claim 15, further comprising a memory which is a contiguous block of memory elements, the memory configured to store pointers to the locations of each of the initiator-side firewall blocks and each of the receiver-side firewall blocks on the SoC at addresses within the memory; the addresses corresponding to, and being determined by firewall identifiers of, respective ones of the initiator-side firewall blocks and receiver-side firewall blocks.

18. A method for sending messages in a system on a chip (SoC), the method comprising:
  determining a location of an initiator-side memory of an initiator-side firewall block and a location of a receiver-side memory of a receiver-side firewall block, using respective pointers to the initiator-side memory and the receiver-side memory stored in a single memory comprising contiguous memory elements, addresses of the pointers within the single memory being determined in at least partial dependence on respective unique firewall identifiers of the initiator side firewall block and of the receiver-side firewall block;
  configuring one or more configuration settings of the initiator-side firewall block and one or more configuration settings of the receiver-side firewall block using an exclusive security configuration controller, the respective pointers, and a security bus which is electrically isolated from a system bus;
  sending a message from a sending functional block to a receiving functional block using the system bus;
  adding a message identifier to the message using the initiator-side firewall block, the identifier added in at least partial dependence on the configuration settings of the initiator-side firewall block; and
  allowing or refusing permission for the receiving functional block to further access the message using the receiver-side firewall block, in at least partial dependence on the message identifier and the configuration settings of the receiver-side firewall block.

19. The method of claim 18, wherein the message identifier uniquely corresponds to the sending functional block.

20. The method of claim 18, wherein the functional blocks are configured not to transmit messages to each other through the security bus.

21. The method of claim 18, wherein the firewall identifier of the initiator-side firewall block and the firewall identifier of the receiver-side firewall blocks are, respectively, unique within the SoC.

* * * * *